United States Patent
Renken et al.

(10) Patent No.: US 11,614,091 B2
(45) Date of Patent: Mar. 28, 2023

(54) SYSTEMS AND METHODS FOR PROTECTING SEALED COMPRESSOR ELECTRICAL FEEDTHROUGH

(71) Applicant: THERMO KING LLC, Minneapolis, MN (US)

(72) Inventors: David J. Renken, Prior Lake, MN (US); Tony Spetz, Afton, MN (US)

(73) Assignee: Thermo King LLC, Minneapolis, MN (US)

( * ) Notice: Subject to any disclaimer, the term of this patent is extended or adjusted under 35 U.S.C. 154(b) by 252 days.

(21) Appl. No.: 16/917,374

(22) Filed: Jun. 30, 2020

(65) Prior Publication Data
US 2021/0404479 A1 Dec. 30, 2021

(51) Int. Cl.
*F04D 27/00* (2006.01)
*B60H 1/32* (2006.01)
(Continued)

(52) U.S. Cl.
CPC ......... *F04D 27/008* (2013.01); *B60H 1/3217* (2013.01); *B60H 1/3226* (2013.01);
(Continued)

(58) Field of Classification Search
CPC ..... F04D 27/008; F04D 25/06; B60H 1/3217; B60H 1/3226; B60H 2001/3238; B60H 2001/3285; H02H 1/0007; H02P 29/027
See application file for complete search history.

(56) References Cited

U.S. PATENT DOCUMENTS 4,252,394 A * 2/1981 Miller ................ H01B 17/305
439/926
4,609,774 A * 9/1986 LeMieux ............ H01B 17/305
439/620.08
(Continued)

FOREIGN PATENT DOCUMENTS

WO 2020/009776 1/2020
WO 2020/055633 3/2020
(Continued)

OTHER PUBLICATIONS

Extended European Search Report, issued in the corresponding European patent application No. 21182195.4, dated Nov. 15, 2021, 9 pages.
(Continued)

*Primary Examiner* — Marc E Norman
(74) *Attorney, Agent, or Firm* — Hamre, Schumann, Mueller & Larson, P.C.

(57) ABSTRACT

A method of feedthrough and overcurrent protection of a sealed compressor used in a transport climate control system ("TCCS") is provided. The TCCS includes a climate control circuit with a sealed compressor. The sealed compressor includes an outer housing and an electrical motor within the outer housing. The method includes operating the sealed compressor to compress a working fluid by supplying electrical power to the electric motor of the sealed compressor via a sealed electrical feedthrough in the outer housing of the sealed compressor. The method also includes detecting an operating parameter of the sealed electrical feedthrough, and determining whether the sealed electrical feedthrough is in a melting condition based on the detected operating parameter. Also, the method includes adjusting operation of the climate control circuit upon determining that the sealed electrical feedthrough is in the melting condition until the
(Continued)

sealed electrical feedthrough is no longer in the melting condition.

18 Claims, 5 Drawing Sheets

(51) Int. Cl.
    *F04D 25/06*     (2006.01)
    *H02H 1/00*     (2006.01)
    *H02P 29/02*     (2016.01)
    *H02P 29/024*     (2016.01)

(52) U.S. Cl.
    CPC ........... *F04D 25/06* (2013.01); *H02H 1/0007* (2013.01); *H02P 29/027* (2013.01); *B60H 2001/3238* (2013.01); *B60H 2001/3285* (2013.01)

(56) References Cited

U.S. PATENT DOCUMENTS

| | | | | |
|---|---|---|---|---|
| 4,830,630 | A * | 5/1989 | Dozier | H01H 85/201 |
| | | | | 439/736 |
| 5,584,716 | A * | 12/1996 | Bergman | H01R 13/5202 |
| | | | | 439/282 |
| 6,290,528 | B1 * | 9/2001 | Moore, Jr. | H01R 13/5216 |
| | | | | 439/367 |
| 6,372,993 | B1 * | 4/2002 | Eckels | H01R 13/521 |
| | | | | 439/282 |
| 6,639,502 | B2 | 10/2003 | Herrick | |
| 7,804,262 | B2 | 9/2010 | Schuster et al. | |
| 11,480,184 | B2 * | 10/2022 | Sugiyama | F04B 53/16 |
| 2010/0031683 | A1 | 2/2010 | Ueda et al. | |
| 2014/0065000 | A1 * | 3/2014 | Tolbert, Jr. | F04B 39/06 |
| | | | | 418/55.4 |
| 2015/0007597 | A1 * | 1/2015 | Sent, Jr. | F25B 1/04 |
| | | | | 62/115 |
| 2017/0201145 | A1 * | 7/2017 | Rooks | H02K 5/12 |
| 2018/0083446 | A1 | 3/2018 | Kern | |
| 2021/0001689 | A1 | 1/2021 | Kondrk et al. | |

FOREIGN PATENT DOCUMENTS

| | | |
|---|---|---|
| WO | 2020/067654 | 4/2020 |
| WO | 2020/236480 | 11/2020 |
| WO | 2021/046107 | 3/2021 |
| WO | 2021/069147 | 9/2021 |

OTHER PUBLICATIONS

"Application Engineering Bulletin: Application Guidelines for ZSK4 & ZFK4, Refrigeration Copeland Scroll™ Compressors 2-9 Horsepower, Emerson Climate Technologies", Inc., Nov. 2018, 25 pages.

* cited by examiner

SYSTEMS AND METHODS FOR PROTECTING SEALED COMPRESSOR ELECTRICAL FEEDTHROUGH

FIELD

This disclosure generally relates to transport climate control systems. More specifically, this disclosure relates to feedthrough protection and overcurrent protection of a sealed compressor used in a transport climate control system.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, on a front wall of the transport unit, etc.).

The transport climate control system can include a climate control circuit with a compressor, a condenser, an expansion valve, and an evaporator. A working fluid can include a refrigerant that can be compressed and expanded as it flows through the climate control circuit and can be used to heat and/or cool the particular space.

BRIEF SUMMARY

The embodiments described herein are generally directed to feedthrough protection and overcurrent protection of a sealed compressor used in a transport climate control system ("TCCS").

In particular, the embodiments described herein can prevent melting of a sealed compressor's sealed electrical feedthrough in TCCS.

Transport units can have a climate controlled space for cargo or passengers that is provided climate control (for controlling e.g., temperature, humidity, atmosphere, etc.) by a climate control circuit of a transport climate control system. The climate control circuit can utilize a working fluid and can include a sealed compressor for compressing the working fluid. The sealed compressor can include a sealed electrical feedthrough for supplying electrical power to an electrical motor of the sealed compressor. Minimizing operation that can cause melting of the sealed electrical feedthrough may be desirable to prevent rupture (e.g., a blowout, etc.) of the sealed electrical feedthrough's potting.

Disclosed embodiments are capable of operating the TCCS to minimize operating in conditions that can cause heating sufficient to melt the sealed electrical feedthrough's potting. Disclosed embodiments can, for example, adjust operation of the TCCS to stop operation of the sealed electrical feedthrough in conditions that can cause heating sufficient to melt the sealed electrical feedthrough. The disclosed embodiments can, for example, further open an EEV and/or interrupt the flow of electrical power through the sealed electrical feedthrough.

In an embodiment, a method of feedthrough protection and overcurrent protection of a sealed compressor used in a TCCS that provides climate control within a climate controlled space of a transport unit is provided. The TCCS includes a climate control circuit with the sealed compressor. The sealed compressor includes an outer housing and an electrical motor within the outer housing. The method includes operating the sealed compressor to compress a working fluid by supplying electrical power to the electric motor of the sealed compressor via a sealed electrical feedthrough in the outer housing of the sealed compressor. The method also includes detecting an operating parameter of the sealed electrical feedthrough. Also, the method includes determining whether the sealed electrical feedthrough is in a melting condition based on the detected operating parameter. Further, the method includes adjusting operation of the climate control circuit upon determining that the sealed electrical feedthrough is in the melting condition until the sealed electrical feedthrough is no longer in the melting condition.

In an embodiment, detecting the operating parameter includes detecting an amperage of the electrical power supplied to the sealed electrical feedthrough. Also, determining whether the sealed electrical feedthrough is in the melting condition includes comparing the detected amperage of the electrical power to a predetermined amperage draw limit. A "melting" condition is an operating condition of the sealed electrical feedthrough that can cause or lead to the melting of the sealed electrical feedthrough. For example, the sealed electrical feedthrough being in the "melting" condition can indicate that the sealed electrical feedthrough is moving towards and/or in danger of reaching condition(s) that cause heating and melting of the sealed electrical feedthrough.

In an embodiment, supplying the electrical power to the electric motor includes supplying the electrical power from an electrical power source of the TCCS to the sealed electrical feedthrough via an electrical disconnecter. Also, adjusting operation of the climate control circuit includes opening the electrical disconnecter to interrupt the electrical power from the electrical power source to the sealed electrical feedthrough.

In an embodiment, supplying the electrical power from the electrical power source to the sealed electrical feedthrough via the electrical disconnecter includes converting, via an inverter, the electrical power supplied from the electrical power source from direct current to alternating current.

In an embodiment, supplying electrical power to the electric motor via the sealed electrical feedthrough includes supplying the electrical power from an electrical power source of the TCCS to the sealed electrical feedthrough via a contactor. Also, detecting the operating parameter of the sealed electrical feedthrough includes detecting a positional status of the contactor, the positional status of the contactor corresponding with an amperage of the electrical power supplied through the sealed electrical feedthrough.

In an embodiment, detecting the operating parameter includes detecting a suction pressure of the sealed compressor. Also, determining whether the sealed electrical feedthrough is in the melting condition includes comparing the detected suction pressure to a predetermined suction pressure threshold.

In an embodiment, an internal space of the outer housing along the sealed electrical feedthrough is below atmospheric pressure when the suction pressure of the sealed compressor is below the predetermined suction pressure threshold.

In an embodiment, adjusting operation of the climate control circuit includes further opening an electronic expansion device ("EEV") of the climate control circuit.

In an embodiment, the further opening of the EEV decreases conditioning provided by the climate control circuit to a climate controlled space of the transport unit.

In an embodiment, the method also includes operating the climate control circuit to provide conditioning for the climate controlled space of the transport unit based on a temperature setpoint for the climate controlled space. Operating the climate control circuit to provide the conditioning includes the operating the sealed compressor to compress the working fluid, and adjusting an electronic expansion valve ("EEV") of the climate control circuit to a first valve position based on a temperature of the working fluid. Also, the adjusting operation of the climate control circuit includes further opening the EEV to a second valve position different from the first valve position.

In an embodiment, the operating parameter of the electrical feedthrough is not for the startup sequence of the sealed compressor.

In an embodiment, the working fluid includes a flammable refrigerant.

In an embodiment, the sealed compressor is at least one of a hermetic compressor and a semi-hermetic compressor.

In an embodiment, A TCCS for providing climate control within a climate controlled space of a transport unit is provided. The TCCS includes a climate control circuit. The climate control circuit includes a sealed compressor to compress a working fluid. The sealed compressor includes an outer housing, an electric motor within the outer housing, and a sealed electrical feedthrough in the outer housing. The climate control circuit also includes a condenser to cool the working fluid, an expansion valve to expand the working fluid, and an evaporator to heat the working fluid. The TCCS also includes an electrical power source and a climate controller. The climate controller is configured to operate the climate control circuit to provide conditioning to the climate controlled space of the transport unit, which includes electrical power being supplied from the electrical power source to the electric motor via the sealed electrical feedthrough. The climate controller is also configured to detect an operating parameters of the sealed electrical feedthrough, determine whether the sealed electrical feedthrough is in a melting condition based on the detected operating parameter, and adjust operation of the climate control circuit when the sealed electrical feedthrough is in the melting condition until the sealed electrical feedthrough is no longer in the melting condition.

In an embodiment, the climate controller is also configured to detect an amperage of the electrical power through the sealed electrical feedthrough, in order to detect the operating parameter of the sealed electrical feedthrough, and determine that the sealed electrical feedthrough is in the melting condition based on comparing the detected amperage of the electrical power to a predetermined amperage draw limit.

In an embodiment, the TCCS also includes an electrical disconnecter electrically connecting the electrical power source to the sealed electrical feedthrough. The climate controller is configured to open the electrical disconnecter to interrupt the electrical power supplied to the electric motor via the sealed electrical feedthrough in order to adjust operation of the climate control circuit such that the sealed electrical feedthrough is no longer in the melting condition.

In an embodiment, the TCCS also includes a contactor electrically connecting the electrical power source to the sealed electrical feedthrough. Also, the climate controller is configured to detect a positional status of the contactor, the positional status of the contactor corresponding with an amperage of the electrical power supplied through the sealed electrical feedthrough in order to detect one or more operating parameters of the sealed electrical feedthrough.

In an embodiment, the climate controller is also configured to detect a suction pressure of the sealed compressor in order to detect the operating parameter, and determine that the sealed electrical feedthrough is in the melting condition based on comparing the detected suction pressure to a predetermined suction pressure threshold.

In an embodiment, the expansion valve is an electronic expansion valve ("EEV"), and the climate controller is configured to further open the electronic in order to adjust operation of the climate control circuit such that the sealed electrical feedthrough is no longer in the melting condition.

In an embodiment, the sealed compressor is a hermetic compressor or a semi-hermetic compressor.

BRIEF DESCRIPTION OF THE DRAWINGS

Both described and other features, aspects, and advantages of transport climate control systems and methods of operating climate control systems will be better understood with the following drawings.

Like reference characters refer to similar features

DETAILED DESCRIPTION

The embodiments described herein are generally directed to feedthrough protection and overcurrent protection of a sealed compressor used in a transport climate control system ("TCCS").

In particular, the embodiments described herein can prevent melting of a compressor's sealed electrical feedthrough in a TCCS.

In the following detailed description, reference is made to the accompanying drawings, which illustrate embodiments in which the invention may be practiced. These embodiments are described in sufficient detail to enable those skilled in the art to practice what is claimed, and it is to be understood that other embodiments may be utilized without departing form the spirit and the scope of the claims. The following detailed description and the accompanying drawings, therefore, are not to be taken in a finite sense.

Different types of goods/cargo may need to be stored at specific environmental condition(s) while being stored within a transport unit. For example, perishable goods may need to be stored within a specific temperature range to prevent spoilage and liquid goods may need to be kept at a temperature above their freezing point. Also, goods having electronic components may need to be kept in environmental conditions with a lower moisture content to avoid damage to their electronic components. Passengers traveling in the transport unit may need to be kept in a climate controlled space with specific environmental condition(s) to ensure their comfort while traveling. For example, the climate controlled space containing the passengers should be at a temperature that is generally comfortable for passengers. A transport climate control system may blow conditioned air into the climate controlled space of the transport unit to keep the air within the climate controlled space at the desired environmental conditions.

A TCCS can include a climate control system with a compressor for compressing working fluid containing refrigerant. The compressor can be a sealed compressor, such as a hermetic or a semi-hermetic compressor, and contains an electrical motor within its sealed outer housing. For example, the sealed compressor can help prevent leakage of working fluid. A hermetic compressor is formed with a housing configured to be permanently sealed (e.g., housing is sealed shut by being completely welded shut, etc.). A semi-hermetic compressor is formed with a housing configured to be sealed shut for its operation while still being openable for maintenance, cleaning, etc. (e.g., housing is sealed shut with seal(s) and removable bolts, etc.). The sealed compressor includes a sealed electrical feedthrough in its sealed outer housing and is used to supply electrical power to the electrical motor. However, various operations of the compressor can lead to and heating of the sealed electrical feedthrough to temperatures that causes melting and the eventual structural failure (e.g., blowout, etc.) of the sealed electrical feedthrough. This can allow, for example, leaking of refrigerant in the working fluid into the surrounding environment and cause the surrounding environment to become dangerous (e.g., leaking flammable refrigerant making the surrounding environment flammable).

The embodiments described herein are generally directed to limiting operation that can cause melting of a compressor's sealed electrical feedthrough in a transport climate control system ("TCCS"). The transport climate control system includes a climate control circuit with a compressor for compressing a working fluid. The climate control circuit is configured to provide conditioning (for controlling e.g., temperature, humidity, atmosphere, etc.) to a climate controlled space. The TCCS includes a climate controller for controlling the climate control circuit. For example, the climate controller can be configured to adjust operation of the climate control circuit to minimize operation that can cause heating and melting of the sealed electrical feedthrough. This can advantageously prevent weakening and accidental rupture of the sealed electrical feedthrough.

Figure 1:
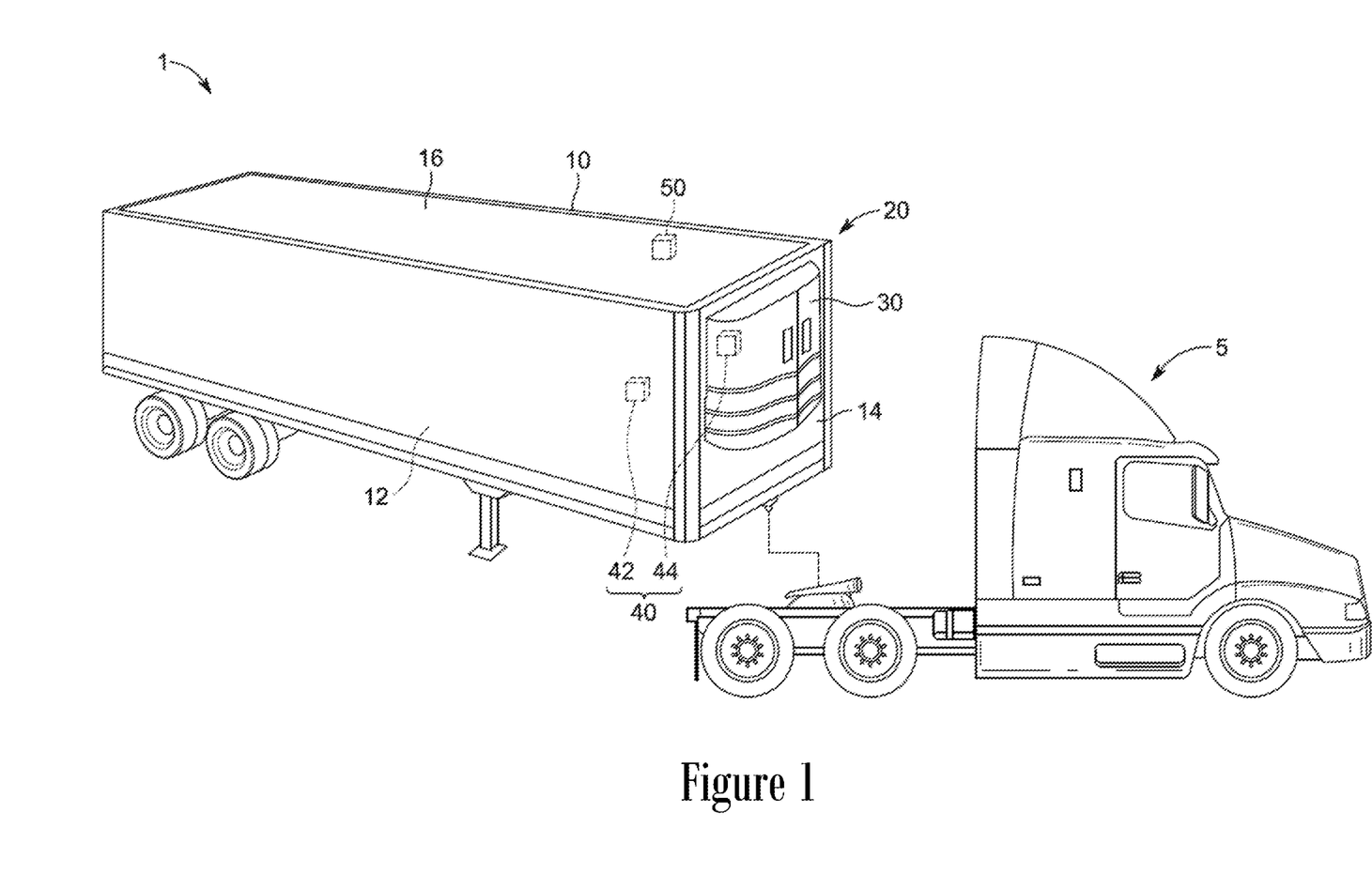
FIG. 1 is a prospective view of an embodiment of a climate controlled transport unit attached to a tractor.

FIG. 1 illustrates one embodiment of a climate controlled transport unit 1 attached to a tractor 5. The climate controlled transport unit 1 includes a transport unit 10 and a transport climate control system ("TCCS") 20 for the transport unit 10. Dashed lines are used in FIG. 1 to illustrate features that would not be visible in the view shown. The transport unit 10 may be attached to the tractor 5 that is configured to tow the transport unit 10 to and from different locations. When not being transported, the transport unit 10 may be parked and unattached from the tractor 5. It will be appreciated that the embodiments described herein are not limited to tractor and trailer units, but can apply to any type of transport unit such as a container (e.g., a container on a flat car, an intermodal container, etc.), a truck, a box car, a commercial passenger vehicle (e.g., school bus, railway car, subway car, etc.), or other similar transport unit.

The TCCS 20 includes a climate control unit ("CCU") 30 that provides environmental control (e.g. temperature, humidity, air quality, etc.) within a climate controlled space 12 of the transport unit 10. The climate controlled space 12 is an internal space of the transport unit 10. The CCU 30 provides conditioned air into the climate controlled space 12 of the transport unit 10 to provide a desired conditioned environment for the goods being held within the climate controlled space 12 of the transport unit 10. The desired conditioned environment for the climate controlled space 12 can have one or more desired environmental conditions (e.g., temperature, humidity, air quality, etc.). For example, the CCU 30 may provide cooled air to the climate controlled space 12 when perishable goods are being kept within the transport unit 10. In another example, the CCU 30 may dehumidify the air within the climate controlled space 12 of the transport unit 10 when electronics are within the transport unit 10. The CCU 30 includes a climate control circuit (e.g., see FIG. 2, etc.) for providing conditioned air to the climate controlled space 12.

The CCU 30 is disposed on a front wall 14 of the transport unit 10. In other embodiments, it will be appreciated that the CCU 30 can be disposed, for example, on a roof 14 or another wall of the transport unit 10. The climate controlled transport unit 1 can include a battery (not shown), an internal combustion engine (not shown), or a both as a power source. The TCCS 20 may be a hybrid power system that uses a combination of battery power and engine power or an electric power system that does not include or rely upon an internal combustion engine of the TCCS 20 or the tractor 5 for power.

The TCCS 20 also includes a programmable climate controller 40 and one or more sensors 50. The sensor(s) 50 are configured to measure one or more parameters of the climate controlled transport unit 1 (e.g., an ambient temperature and/or ambient humidity outside of the transport unit 10, a compressor suction pressure, a compressor discharge pressure, a temperature of air supplied into the climate controlled space 12 by the CCU 30, a temperature of air returning from the climate controlled space 12 to the CCU 30, a humidity within the climate controlled space 12, etc.) and communicate parameter data to the climate controller 40. The climate controller 40 is configured to control operation of the TCCS 20 including components of the climate control circuit. The climate controller 40 may be a single integrated control unit 42 or a control unit formed by a distributed network of climate controller elements 42, 44. The number of distributed control elements in a given network can depend upon the particular application of the principles described herein.

Figure 2:
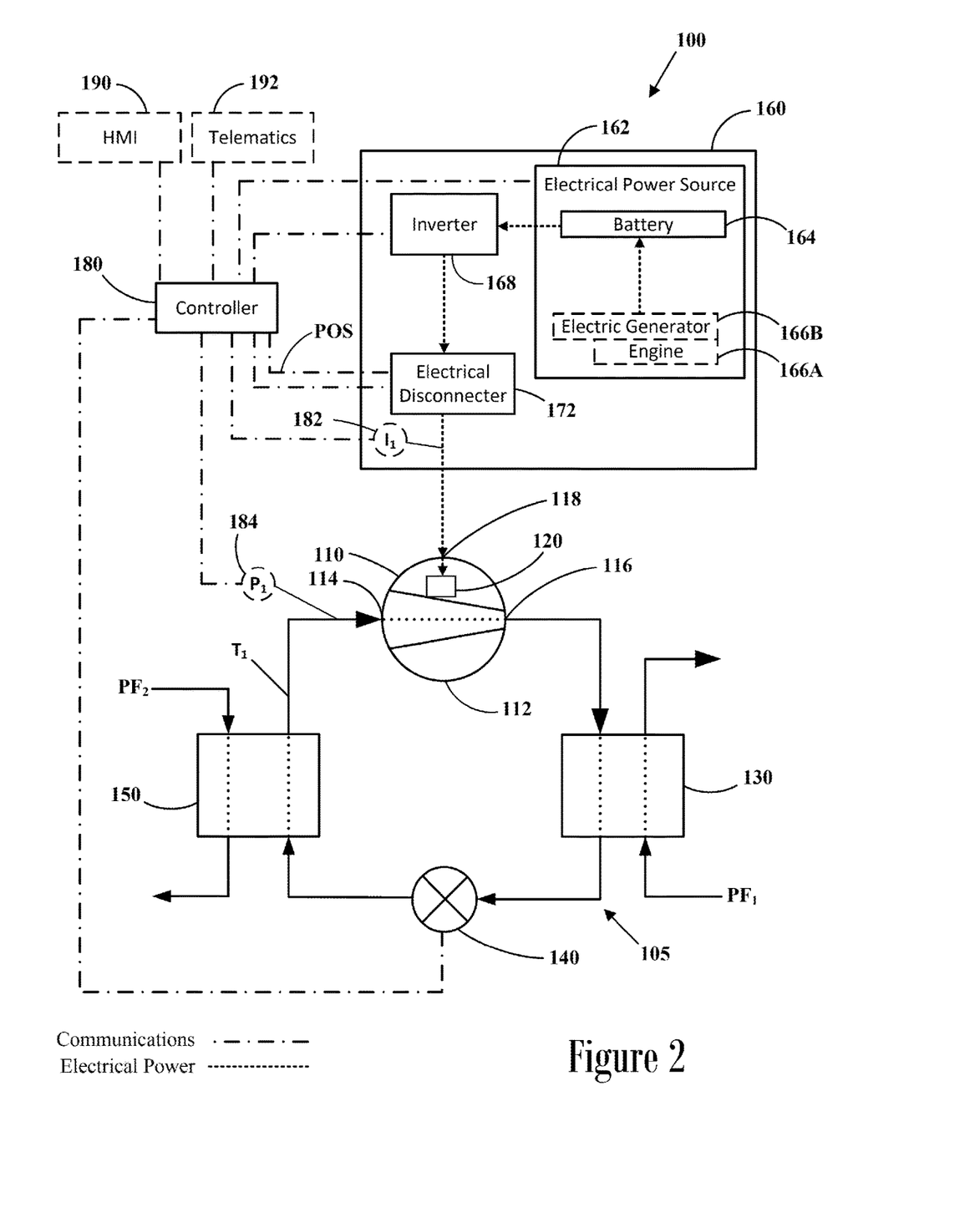
FIG. 2 is a schematic diagram of a transport climate control system, according to an embodiment.

FIG. 2 is a schematic diagram of an embodiment of a TCCS 100. The TCCS can be a TCCS of a climate controlled transport unit (e.g., the TCCS 20 in FIG. 1, etc.). The TCCS includes a climate control circuit 105. The climate control circuit 105 can be utilized to control environmental condition(s) (for controlling e.g., temperature, humidity, atmosphere, etc.) of the climate controlled space of a transport unit (e.g., climate controlled space 12 of transport unit 10 in FIG. 1, etc.).

The climate control circuit 105 includes a compressor 110, a condenser 130, an expansion valve 140, and an evaporator 150. In an embodiment, the climate control circuit 105 can be modified to include additional components, such as, for example, one or more additional valve(s), sensor(s), a distributor, an accumulator tank, a filter drier, a receiver tank, an overflow tank, etc. In an embodiment, the climate control circuit 105 can be disposed in a CCU of the TCCS 100 (e.g., in the CCU 30 in FIG. 1, etc.).

Operation of the climate control circuit 105 is controlled by a programmable climate controller 180. The climate controller 180 is configured to detect various operating parameters of the climate control circuit 105. For example, the climate controller 180 can use one or more sensor(s) (e.g.; sensors 50 in FIG. 1, current sensor 182, suction pressure sensor 184, etc.) for detecting one or more operating parameters of the TCCS 100 and its climate control circuit 105. In an embodiment, the climate controller 180 includes a memory (not shown) for storing information and a processor (not shown). The climate controller 180 is configured to control operation of the TCCS 100 and its components. The climate controller 180 is shown in FIG. 2 as a single integrated control unit. However, it will be appreciated that the climate controller 180 in an embodiment may a single integrated control unit or a distributed network of climate controller elements (e.g., distributed network of climate controller elements 42, 44 in FIG. 1, etc.).

The components of the climate control circuit 105 are fluidly connected. Dotted lines are provided in FIG. 2 to indicate fluid flows through various components (e.g., compressor 110, condenser 130, evaporator 150) for clarity, and should be understood as not specifying a particular route within each component. Dashed lines are provided in FIGS. 2 and 4 to indicate optional features in some embodiments. Dashed dotted lines are provided in FIG. 2 to illustrate electronic communications between different components. For example, a dashed dotted line extends from the climate controller 180 to the inverter 168 as the climate controller 180 is configured to control the inverter 168. Short dashed lines are provided in FIGS. 2 and 3 to indicate flows of electrical power between components. For example, the electrical power source 162 supplies electrical power to the inverter 168.

A working fluid flows through climate control circuit 105. The working fluid includes refrigerant. The refrigerant in the working fluid can be a non-flammable refrigerant or a flammable refrigerant. For example, flammable refrigerant can be a single refrigerant or a refrigerant blend (e.g., a combination of two or more refrigerants) that classifies as A2L-B3 under ASHRAE Standard 34 (e.g., ASHRAE Standard 34-2019). For example, non-flammable refrigerant can be a single refrigerant or refrigerant blend that classifies as A1 or B1 under ASHRAE Standard 34. In an embodiment, the working fluid includes at least one flammable refrigerant. In an embodiment, the refrigerant of the working fluid includes one or more refrigerants that classify as A2L. For example, the refrigerant can be a single refrigerant or a refrigerant blend that classifies as an A2L refrigerant under ASHRAE Standard 34. It should be noted that a working fluid can also include non-refrigerant components. For example, non-refrigerant components can be, but not limited to, lubricants, impurities, refrigeration system additives, tracers, ultraviolet dyes, and solubilizing agents. In general, these additional components are present in small concentrations relative to the refrigerant(s) in the working fluid.

In an embodiment, the climate control circuit 105 is configured to operate in a cooling mode to provide conditioned air (e.g., cooled air) to the climate controlled space. Flow of the working fluid through the climate control circuit 105 in the cooling mode when operating normally (e.g., no adjustment(s) being made to avoid the sealed electrical feedthrough 118 being in a melting condition, etc.) is described below. Generally, when operating in a cooling mode, the flow path in the climate control circuit 105 for the working fluid is from the compressor 110 to the condenser 130, from the condenser 130 to the expansion valve 140, from the expansion valve 140 to the evaporator 150, and from the evaporator 150 back to the compressor 110.

Beginning at the compressor 110, the compressor 110 includes an outer housing 112 with a suction port 114, a discharge port 116, and a sealed electrical feedthrough 118. The compressor 110 is a sealed compressor in which the outer housing 112 is a sealed housing. In an embodiment, the sealed compressor 110 is a hermetic compressor or a semi-hermetic compressor. The compressor 110 includes an electrical motor 120 and a compression mechanism (not shown) (e.g., one or more rotatable/orbitable scroll(s), piston(s), screw(s), etc.) disposed within its sealed outer housing 112. The outer housing 112 is configured to fluidly seal the internal components of compressor 120 (e.g., the electrical motor 120, its compression mechanism, etc.) from the outside environment (e.g., external air, etc.) while allowing the working fluid to flow into/out of the outer housing 112 (e.g., through the suction port 114, the discharge port 116, etc.). For example, the outer housing 112 is fluidly sealed except for its ports for the climate control circuit 105 (e.g., the suction port 114, the discharge port 116, etc.). When supplied with electrical power, the electrical motor 120 converts the electrical power to mechanical power that drives the compression mechanism and compresses the working fluid. The electrical power is provided through the sealed outer housing 112 via the sealed electrical feedthrough 118 in the sealed outer housing 112. The sealed electrical feedthrough 118 is discussed in more detail below.

Working fluid in a lower pressure gaseous state or mostly gaseous state is suctioned into the compressor 110 via its suction port 114. The working fluid is compressed as it flows through the compressor 110. Operation of the electrical motor 120 causes the compression of the working fluid (e.g., operation of the electrical motor 120 drives the compression mechanism to compress the working fluid, etc.). Compressed working fluid is discharged from the compressor 110 via its discharge port 116 and flows to the condenser 130.

The condenser 130 cools the compressed working fluid as it passes through the condenser 130. A first process fluid $PF_1$ flows through the condenser 130 separate from the working fluid. The first process fluid $PF_1$ can be ambient air (e.g., air from outside the transport unit 1 in FIG. 1, etc.), an intermediate fluid (e.g., a solution including water, glycol, etc.) cooled by ambient air, or the like. The condenser 130 is a heat exchanger that allows the working fluid and the first process fluid $PF_1$ to be in a heat transfer relationship without physically mixing as they each flow through the condenser 130. As the working fluid flows through the condenser 130, the first process fluid $PF_1$ absorbs heat from the working fluid and cools the working fluid. The working fluid is cooled by the condenser 130 and becomes liquid or mostly liquid as it passes through the condenser 130. The cooled working fluid flows from the condenser 130 to the expansion valve 140.

The expansion valve 140 expands the cooled working fluid from the condenser 130 as it passes therethrough. The expansion causes the working fluid to decrease in temperature. The expanded working fluid is in a two-phase gaseous/liquid phase. The expanded gaseous/liquid working fluid flows from the expansion valve 140 to the evaporator 150. In an embodiment, the expansion valve 140 is an electronic expansion valve ("EEV") with an opening that is adjustable to change the amount of working fluid flowing through the expansion valve 140. During normal operation (e.g., providing conditioning, no adjustment for a melting condition of the sealed electrical feedthrough 118), the climate controller 180 can be configured to control the opening of the EEV 140 based on the superheat of the working fluid after passing through the evaporator 150. For example, the climate controller 180 can be configured to control the opening of the EEV 140 (e.g., select its open valve position) such that the temperature $T_1$ of the heated working fluid is at or about a target temperature/range. The target temperature/range can correspond with the predetermined amount/range of the superheat.

The evaporator 150 heats the expanded working fluid expanded as it passes through the evaporator 150. As shown in FIG. 2, a second process fluid $PF_1$ separate from the working fluid conditions (e.g., cools, heats, etc.) the climate controlled space. For example, the second process fluid $PF_2$ can be air from the climate controlled space that is circulated through the evaporator 150 and back to the climate controlled space to cool the climate controlled space. The second process fluid $PF_2$ can be an intermediate fluid (e.g., a solution including water, glycol, etc.) used to condition the air of the climate controlled space. The evaporator 150 is a heat exchanger that allows the working fluid and the second process fluid $PF_2$ to be in a heat transfer relationship without physically mixing as they each flow through the evaporator 150. As the working fluid flows through the evaporator 150, the working fluid absorbs heat from the air and cools the second process fluid $PF_2$. The working fluid is heated by the evaporator 150 and becomes gaseous or mostly gaseous as it passes through the evaporator 150. The heated working fluid flows from the evaporator 150 back to the suction port 114 compressor 110.

The TCCS 100 includes an electrical power system 160 that supplies electrical power to the electrical motor 120 of the compressor 110. The electrical power system 160 can include an electrical power source 162, an inverter 168, and an electrical disconnecter 170. The electrical power source 164 provides the electrical power for powering the electrical motor 120 of the compressor 110. For example, the electrical power source 162 can supply the electrical power to the motor 120 via at least the electrical disconnecter 172. In an embodiment, the electrical power supplied from the electrical power source 162 may be direct current (DC) electrical power. The electrical power source 164 can supply direct current (DC) to the inverter 168 that converts the DC power into AC power. In an embodiment, the electrical power source 162 can include a battery 164 that provides the electrical power for powering the motor 120. In an embodiment, the electrical power source 162 may also include an internal combustion engine 166A and electric generator 166B as a local power source. The internal combustion engine 166A and electric generator 166B may be provided in the TCCS 100 (e.g., located in the CCU 30 in FIG. 1, etc.) and/or in a vehicle that hauls the transport unit of the TCCS 100 (e.g., the tractor 5 in FIG. 1, etc.). In an embodiment, the internal combustion engine 166A and electric generator 166B can be used for charging the battery 164 during transport. For example, the battery 164 is the primary power source of the motor 120 of the compressor 110. In other embodiments, TCCS 100 may be a pure electrical system (e.g., does not utilize an internal combustion engine 166A) that relies upon utility power for charging the battery 164.

The inverter 168 converts the DC power supplied from the electrical power source 162 (e.g., from the battery 164) into alternating current (AC) which is supplied to the motor 120. The compressor 120 can be a multi-speed compressor in which the motor 120 is a variable speed motor. The frequency of the AC supplied to the motor 120 controls the speed at which the motor 120 operates. The climate controller 180 is configured to control the speed of the motor 120 by controlling the output frequency of the inverter 168. For example, the controller 180 controls the inverter 168 to control the speed of the motor 120 (e.g., to change the speed of the motor 120, etc.). The speed of the compressor 110 may be selected based on the amount of conditioning desired for the climate control circuit 105 (e.g., the climate controller 180 operating the compressor 110 at a higher speed when there is a higher cooling/heating demand for the climate controlled space).

As shown in FIG. 2, the electrical power flows through an electrical disconnecter 172 to reach the compressor 110. The climate controller 180 is configured to operate the electrical disconnecter 172 based on the amperage being supplied to the compressor 110. The electrical disconnecter 172 has an on position and an off position. In the on position, the electrical power flows from the electrical disconnecter 172 to the compressor 110. In the off position, the electrical disconnecter 172 is open such that the electrical power (e.g., each current of the electrical power, etc.) does not flow through the electrical disconnecter 172 (e.g., no electrical power is supplied to the compressor 110 or its motor 120). The climate controller 180 is configured to control the position of the electrical disconnecter 172. In an embodiment, the electrical power is multi-phase power and the electrical disconnector 172 in the off position will interrupt the flow of electrical power for all currents of the multi-phase power.

In an embodiment, the electrical disconnecter 172 may be a contactor having a contact position POS. For example, the contact position POS is a position of a contact (not shown) in the contactor. The contact position POS corresponds with the amperage $I_1$ of the electric power flowing through the contactor as the amperage $I_1$ through the contactor changes the contract position POS. The climate controller 180 can be configured to determine the amperage $I_1$ of the electric current flowing through the contactor and to the compressor 110 using the contact position POS. In an embodiment, the climate controller 180 may detect the positional status POS by a contactor positional status POS signal transmitted from the contactor to the climate controller 180. In an embodiment, the electrical power is multi-phase power and the contactor has a contact for each current in the multi-phase power. For example, the climate controller 180 can be configured to detect the contact position and determine the amperage for each current in the multi-phase power.

In an embodiment, the climate controller 180 is connected to an HMI 190 and a telematics unit 192. The HMI 190 allows the climate controller 180 to display a warning to an operator of the climate controlled transport unit (e.g., the climate controlled transport unit 1 in FIG. 1, etc.) of the TCCS 100. As shown in FIG. 2, the TCCS 100 can include the HMI 190. For example, the CCU of the TCCS 100 (e.g., the CCU 30 in FIG. 1, etc.) may include the HMI 190. In another embodiment, a vehicle for towing the transport unit of the TCCS (e.g., the tractor 5 in FIG. 1, etc.) can include the HMI 190. The telematics unit 192 allows the climate controller 180 to wirelessly communicate a warning to a remote device (not shown) (e.g., a computer, a server, a server network, etc.).

In some embodiments, the TCCS 100 can include a current sensor 182 that measures the amperage $I_1$ of the electrical power supplied to the compressor 110. The climate controller 180 can be configured to detect, via the current sensor 182, the amperage $I_1$ of the electrical power supplied to the compressor 110. The electrical disconnecter 172 may be an interrupter breaker, switch, relay, contactor, etc. operated by the controller 180. The climate controller 180 can be configured to operate the electrical disconnecter 172 based on the amperage $I_1$ of the electrical power supplied to the compressor 110. The current sensor 182 measures the electrical power supplied by the inverter 168 to the compressor 110.

As shown in FIG. 2, the current sensor 182 measures the electrical power between the electrical disconnecter 172 and the compressor 110. In other embodiments, the current sensor 182 may be disposed to measure the electrical power between the inverter 168 and the electrical disconnecter 172. In an embodiment, the current sensor 182 may be incorporated into the electrical disconnecter 172 or the inverter 168.

The compressor 110 includes the sealed electrical feedthrough 118 in its outer housing 112. The sealed electrical feedthrough 118 directs the electrical power for the electrical motor 120 through the outer housing 112 of the compressor 110 while retaining the hermetic sealing of the compressor 110 (e.g., the hermetic sealing of its outer housing 112, etc.). For example, the working fluid within the compressor 110 is unable to pass through the sealed electrical feedthrough 118.

Figure 3A:
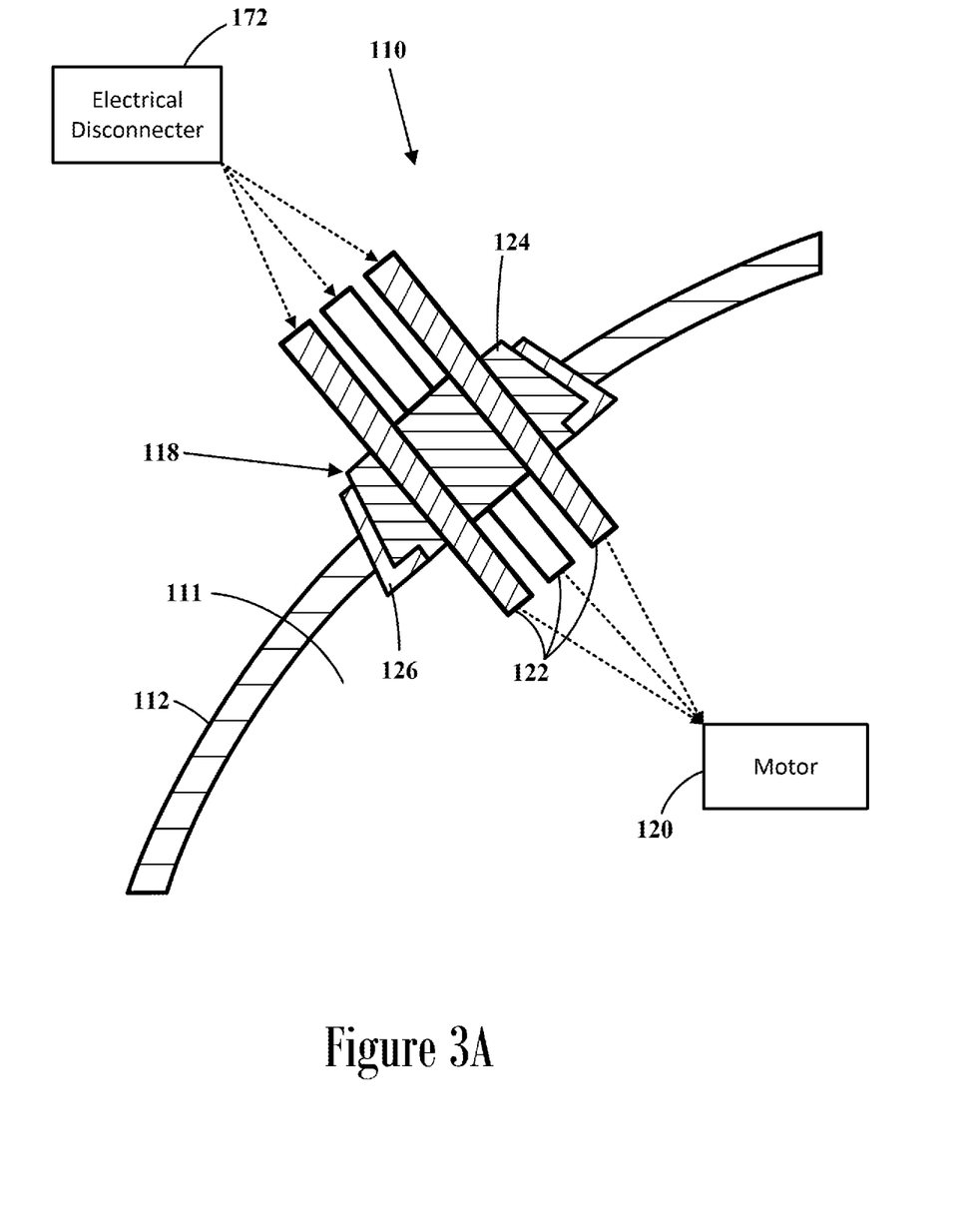
FIG. 3A is a schematic cross-sectional view of a sealed electrical feedthrough of a compressor, according to an embodiment.
Figure 3B:
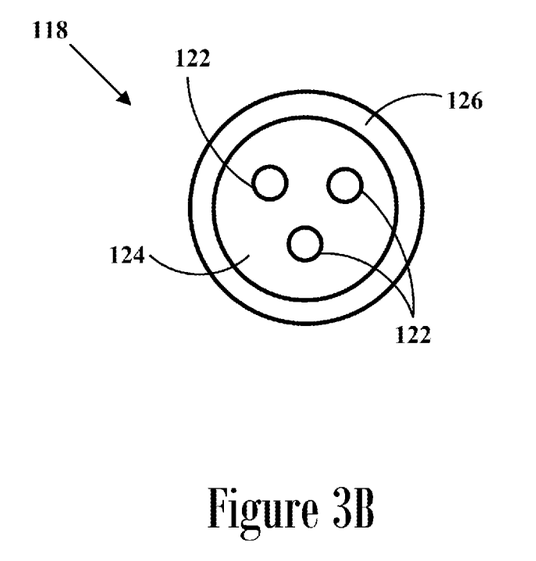
FIG. 3B is a front view of the sealed electrical feedthrough in FIG. 3A, according to an embodiment.

FIG. 3A shows a schematic cross section of the electrical feedthrough 118 in the compressor 110, according to an embodiment. FIG. 3B shows a front view of the electrical feedthrough 118, according to an embodiment. The sealed electrical feedthrough 118 passes the electrical power through the outer housing 112 while maintaining the seal of the outer housing 112.

As shown in FIG. 3A, the sealed electrical feedthrough 118 includes electrical pins 122, potting 124, and an outer ring 126. The sealed electrical feedthrough 118 extends through a port 113 in the housing 112 of the compressor 110. The sealed electrical feedthrough 118 fluidly seals the port 113 such the compressor 110 remains hermetically sealed (e.g., does not allow gaseous refrigerant of the working fluid to pass through the port 113, etc.). The outer ring 122 of the electrical feedthrough 118 is affixed to the housing 112 so as to seal the port 113. For example, the outer ring 122 can be a metal ring welded to the housing 112.

The electrical pins 122 each extend through the potting 124 to the sealed internal space 111 of the compressor 110. Each electrical pin 122 provides an electrical conduit through the sealed outer housing 112. The electrical current(s) of the electrical power for the motor 120 flow through the sealed electrical feedthrough 118 through a respective one of the electrical pins 122. For example, each pin 122 has an exterior end connected to the power source 162 (e.g., via the electrical disconnecter in FIG. 3A, etc.) and interior end connected to the motor 120. The electrical feedthrough 118 in FIGS. 3A and 3B has three electrical pins 122 for conducting each phase of three-phase AC. However, it should be appreciated that the electrical feedthrough 118 can have a different number of electrical pins 122 than three based configuration of the compressor 110 (e.g., the type of power for the motor 120). In other embodiments, the sealed electrical feedthrough 118 can include one or more electrical pins 122. For example, the electrical feedthrough 118 in an embodiment may have a single electrical pin 112 electrical power to the electrical motor 120 (e.g., a motor configured to utilize DC electrical power or single phase electrical power, etc.). For example, the electrical feedthrough 118 in an embodiment may include more than 3 electrical pins 122 (e.g., include additional electrical pin(s) 122 for supplying separate electrical power/connections into the compressor 110, etc.).

The potting 124 fills and seals the internal space of the outer ring 126. As shown in FIG. 3B, the potting 124 is provided between the outer ring 126 and each of the electrical pins 122, and in-between the electrical pins 122. For example, the potting 124 can hold each of the electrical pins 122 in place within the outer ring 126. The potting 124 forms the internal seal of the outer ring 126 (e.g., prevents working fluid, external air, etc. from passing through the outer ring 126, etc.). The potting 124 is an electrically insulating polymer (e.g., a non-electrically conductive polymer, an electrically insulating epoxy, etc.) that is solid at room temperature. The electrical pins 122 are made of an electrically conductive material (e.g., metal, metalloid, etc.).

The electrical insulating potting of the sealed electrical feedthrough can melt if heated to its melting point (e.g., if heated to the melting point of the electrically insulating polymer). Melting of the potting (e.g., melting at least a portion of the potting) degrades its structural integrity. Heating sufficient to melt the potting can weaken structural integrity of the sealed electrical feedthrough. The pressure of the compressed working fluid (e.g., a discharge pressure of the compressor, etc.) can rupture the weakened sealed electrical feedthrough (e.g., break the sealing of the potting, blowout the potting and/or the electrical pins 122, etc.). Working fluid can then leak from the compressor into its external environment (e.g., into an internal space of the CCU) through the ruptured electrical feedthrough. For example, a ruptured electrical feedthrough can allow a flammable refrigerant to leak and cause an external environment of the compressor to become a flammable environment.

In many configurations, the sealed electrical feedthrough is disposed in the suction side of compressor (e.g., extends into a portion of the sealed outer housing's internal volume that is upstream of the compressor's compression mechanism, that contains the pre-compressed working fluid, and is generally at a suction pressure, etc.). When the compressor 110 is operating such that the suction pressure at the suction side of the compressor is in a vacuum condition, the sealed electrical feedthrough increases electrical charge buildup at the sealed electrical feedthrough, which increases the potential/occurrence of arcing at the electrical pin(s) (e.g., between its electrical pins, from its electrical pin(s), etc.). The specific amount of pressure (e.g., how much below atmospheric pressure) that causes increased potential/occurrence of arcing can vary based on the configuration of the compressor. The electrical arcing can heat the electrical pin(s) which then heat the potting. The electrical arcing can heat and melt the potting (e.g., heats at least a portion of the potting to its melting point). Discharge pressures of the compressor can then rupture the weakened sealed electrical feedthrough as similarly discussed above. For example, improper servicing, a software malfunction, and/or a hardware malfunction in the refrigerant system can cause the discharge pressure to be applied to the suction side of the compressor Various electrical and mechanical issues can cause an electrical motor to draw an increased amperage sufficient to heat and melt the potting. For example, electrical shorts and/or the electrical motor/compressor having a locked rotor can cause the electrical motor to draw a higher amount of amperage. Higher amperage through the pin(s) of the electrical feedthrough can cause resistive heating of the electrical pin(s) that heats and melts the potting (e.g., heats at least a portion of the potting to its melting point). Discharge pressures of the compressor can then blowout the potting.

Such electrical shorts occur within the compressor. For example, the electrical shorts that can cause increased amperage sufficient to heat and melt the potting can occur at the sealed electrical feedthrough (e.g., arcing at the electrical pin(s), etc.), between the sealed electrical feedthrough and the electrical motor, and/or within the electrical motor (e.g., in the windings of the electrical motor, etc.). As compressors wear, metallic particles develop in the working fluid. As the metallic particles move can adhere to inner surfaces of the compressor including electrical pin(s) of the electrical feedthrough. Buildup of the metallic particles on the electrical feedthrough and its electrical pin(s) can break down the dielectric properties of the electrical pin(s) that prevent arcing. For example, the building of the metallic particles can create a conductive path between the pins that causes an electrical short.

A locked rotor of the electrical motor/compressor can be caused by, for example, the torque on the electrical motor exceeding its maximum torque, loss of phase(s) of the multiphase power provided to the electrical motor, and/or mechanical failure of the electrical motor (e.g., mechanical seizer of the compressor, a bearing failure, interference issue, etc.).

The TCCS 100 is configured to prevent melting of the potting 124 of the sealed electrical feedthrough 118. The climate controller 180 can be configured to operate TCCS 100 to limit operation of the sealed electrical feedthrough 118 in a melting condition that can cause melting of its potting 124. A "melting" condition is an operating condition of the sealed electrical feedthrough (e.g., a condition under which the sealed electrical operates) that can cause or lead to the potting 124 being heated to a temperature that melts the potting 124 (e.g., conditions that occur before the potting 124 reaches its melting temperature, etc.). For example, the sealed electrical feedthrough being in the "melting" condition can indicate that the sealed electrical feedthrough is moving towards and/or in danger of reaching condition(s) that can cause heating and melting of the sealed electrical feedthrough. For example, the climate controller 180 can operate the climate control circuit 105 to minimize operation in conditions with an increased potential of electrical arcing at the sealed electrical feedthrough 118 (e.g., at the electrical pins 112) and/or with an amperage $I_1$ supplied through the sealed electrical feedthrough 118 that can cause heating sufficient to melt its potting 124. For example, the sealed electrical feedthrough 118 is in the melting condition when: operating the sealed electrical feedthrough 118 in pressures that can cause electrical arcing at the sealed electrical feedthrough 118 sufficient to heat and melt the potting 124, and/or with an amperage $I_1$ through the sealed electrical feedthrough 118 sufficient to cause heating and melting of the potting 124.

In an embodiment, the climate controller 180 is configured to determine whether the sealed electrical feedthrough 118 is in a melting condition based on one or more detected operating parameters. The one or more detected operating parameters can include one or more of the suction pressure $P_1$ of the compressor 110 and the amperage $I_1$ of the electrical power through the sealed electrical feedthrough 118. For example, the climate controller 180 can compare the detected suction pressure $P_1$ to a predetermined suction pressure threshold and/or compare the detected amperage $I_1$ to a predetermined amperage draw limit. In an embodiment, the sealed electrical feedthrough 118 is in a melting condition when the detected suction pressure $P_1$ is less than a predetermined suction pressure threshold or when the detected amperage $I_1$ exceeds a predetermined amperage draw limit.

For example, the predetermined amperage draw limit can be a limit based on normal current draws of the motor 120 (e.g., current draws of the motor 120 without any electrical shorts or a locked rotor, not during the normal startup period of the motor 120, etc.). The predetermined amperage draw limit can be a value determined based on previous testing (e.g., of the compressor 110, of the motor 120, of the climate control circuit 105, of a motor/compressor/climate control circuit with the same or a similar configuration, etc.). In an embodiment, the predetermined amperage draw limits is lower than a minimal amperage that can cause heating sufficient to melts the potting 124 of the sealed electrical feedthrough 118.

For example, when the suction pressure $P_1$ of the compressor 110 is below the predetermined suction pressure threshold, the internal space 111 of the outer housing 112 with the sealed electrical feedthrough 118 has a pressure below atmospheric pressure (e.g., the inward end(s) of pin(s) 122 of the sealed electrical feedthrough 118 are in vacuum, etc.). The predetermined suction pressure threshold can be a value determined based on previous testing of the negative pressures that cause arcing along/between the electrical pin(s) 122 of the sealed electrical feedthrough 118 (e.g., testing of the of the compressor, of a motor/compressor/working fluid/refrigerant/climate control circuit with the same or a similar configuration, etc.). In an embodiment, the suction pressure $P_1$ and the pressure of the internal space of the outer housing 112 into which the sealed electrical feedthrough 118 extends (e.g., pressure of the internal space 111) can be at or about the same.

The climate controller 180 can be configured to detect each of the one or more operating parameters for determining whether the sealed electrical feedthrough 118 is in a melting condition. For example, the climate controller 180 can be configured to detect the suction pressure $P_1$ of the compressor 110 using a suction pressure sensor 184 of the climate control circuit 105. The suction pressure sensor 184 may be provided in the climate control circuit 105 between the evaporator 150 and the compressor 110 (e.g., downstream of the evaporator 150 and upstream of the suction port 114 of the compressor 110). For example, the climate controller 180 can be configured to detect the amperage $I_1$ of the electrical power through the sealed electrical feedthrough 118 using a contact position POS of a contactor. For example, the climate controller 180 can be configured to detect the amperage $I_1$ of the electrical power through the sealed electrical feedthrough 118 using the current sensor 182. In an embodiment, the electrical power supplies to the motor 120 may be multi-phase AC electrical power. In such an embodiment, the climate controller 180 may be configured to detect the amperage of each phase of the multi-phase AC electrical power (e.g., amperage of a first phase/current, amperage of a second phase/current, amperage of the third phase/current). For example, the contactor can have a contact for each phase, and the climate controller 180 is configured to detect a respective contact position POS of the contactor for each phase.

In an embodiment, the climate controller 180 is configured to adjust operation of the climate control circuit 105 so that the sealed electrical feedthrough 118 is not in a melting condition. For example, when the sealed electrical feedthrough 118 is in a melting condition, the climate controller 180 adjusts operation of the climate control circuit 105 so that the sealed electrical feedthrough 118 is no longer in a melting condition. In an embodiment, the adjustment of the climate control circuit 105 can include further opening the EEV 140 (e.g., adjusting the opening of the EEV 140 to allow more working fluid to flow through the EEV 140) and/or interrupting the flow of electrical power to the electrical motor 120. For example, the climate controller 180 may be configured to open the electrical disconnecter 172 (e.g., open the contactor, etc.) to interrupt the flow of the electrical power through the sealed electrical feedthrough 118 for the electrical motor 120.

Figure 4:
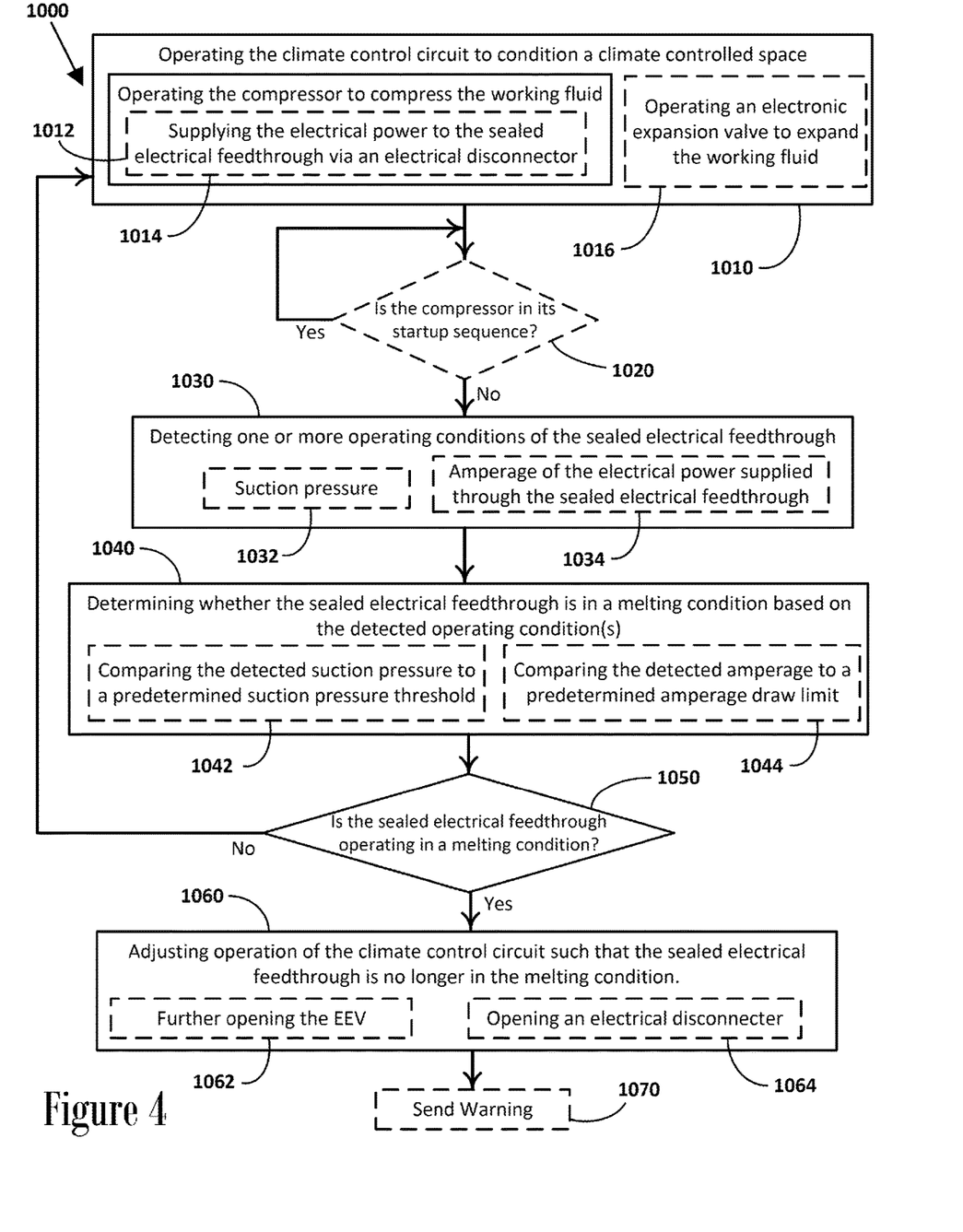
FIG. 4 is a flow chart of a method of controlling a transport climate control system, according to an embodiment.

FIG. 4 is a flow chart for a method 1000 of controlling a TCCS that provides climate control within a climate controlled space of a transport unit. In an embodiment, the method may be employed to control the TCCS 20 in FIG. 1 (e.g., employed by the climate controller 40, etc.) and as described above. In an embodiment, the method 1000 may be employed to control the TCCS 100 in FIG. 2 (e.g., employed by the climate controller 180, etc.) and as described above. For example, a climate controller 180 of the TCCS 100 may employ the method 1000. The method 1000 starts at 1010.

At 1010, the TCCS operates a climate control circuit (e.g., climate control circuit 105) to condition a climate controlled space (e.g., climate controlled space 12). In an embodiment, the climate controlled space is the climate controlled space of a transport unit (e.g., climate controlled space 12 of the transport unit 10). The climate controlled circuit includes a sealed compressor (e.g., compressor 110), a condenser (e.g., condenser 130), an expansion valve (e.g., expansion valve 140), and an evaporator (e.g., evaporator 150). The compressor includes a sealed outer housing (e.g., outer housing 112), an electric motor (e.g., electric motor 120) disposed within the sealed outer housing, and a sealed electrical feedthrough (e.g., sealed electrical feedthrough 118) that extends through the outer housing. For example, electrical power powering the electrical motor is supplied through the sealed outer housing via the sealed electrical feedthrough in the sealed outer housing. The sealed electrical feedthrough extends through the sealed outer housing and is electrically connected to the electric motor.

Working fluid flows through the climate controlled circuit (e.g., working fluid of the climate control circuit 105). The compressor compresses the working fluid, the condenser cools the working fluid, the expansion valve expands the working fluid, and the evaporator heats the working fluid. The climate controller operates the climate controller circuit to provide climate control (for controlling e.g., temperature, humidity, atmosphere, etc.) within the climate controlled space based on a temperature setpoint for the climate controlled space. For example, the climate control circuit can operate in a cooling mode to supply conditioned air (e.g., cooled air, etc.) to the climate controlled space so that the climate controlled space is cooled to be at or about the temperature setpoint.

Operating the climate control circuit to condition the climate controlled space at 1010 includes operating the compressor to compress the working fluid at 1012. Operating the compressor to compress the working fluid at 1012 includes supplying electrical power to the electrical motor of the compressor via the sealed electrical feedthrough of the compressor. The TCCS includes an electrical power system (e.g., electrical power system 160) with an electrical power source (e.g., electrical power source 162) for providing the electrical power to power the electrical motor of the compressor. For example, the electrical power source can include a battery (e.g., battery 164) as a primary energy source. Optionally, the electrical power source may include a local power generator (e.g., internal combustion engine 166A, electric generator 166B, etc.) for charging the battery during transport.

In an embodiment, supplying the electrical power to the electrical motor the compressor via the sealed electrical feedthrough at 1012 can include supplying electrical power from the power source to the sealed electrical feedthrough via an electrical disconnecter (e.g., electrical disconnecter 172) 1014. The electrical power flows through the electrical disconnecter as it flows from the electrical power source to the sealed electrical feedthrough. In some embodiments, the electrical power supplied by the power source is DC power (e.g., DC power supplied by the battery) and an inverter (e.g., inverter 168) converts the electrical power DC power to AC power. The inverter can electrically connect the electrical power source to the electrical disconnecter. In such embodiments, supplying the electrical power from the electrical power source to the sealed electrical feedthrough via the electrical disconnecter at 1014 may include the inverter inverting the electrical power from DC power to AC power. In an embodiment, the climate controller can be configured to control the output frequency of the inverter to control the speed of the compressor. For example, the speed of the compressor can be controlled/selected based on the amount of conditioning desired for the climate controlled space.

In an embodiment, the expansion valve is an electronic expansion valve (EEV) that is controlled by the climate controller to adjust flow rate of working fluid through the EEV. Operating the climate control circuit to condition the climate controlled space at 1010 can include the climate controller operating the EEV to expand the working fluid at 1016. For example, operating the EEV at 1016 can include the climate controller adjusting the EEV (e.g., its valve position) based on a temperature of the working fluid after being heated by the evaporator (e.g., temperature $T_1$). For example, the climate controller can be configured to keep the superheat of the heated working fluid at or about a predetermined amount or range (e.g., configured to keep the temperature of the heated working fluid at or about the amount or range corresponding with predetermined amount or range of superheat, etc.). For example, the climate controller can adjust the EEV to a first valve position based on said temperature of the heated working fluid (e.g., the EEV in the first valve position results in the temperature of the heated working fluid at the amount/range corresponding with the predetermined amount/range of superheat, etc.). The method 1000 then proceeds from 1010 to 1030 or optionally to 1020 first.

At optional 1020, the climate controller can determine whether the compressor is in its startup sequence. The compressor can operate differently during its startup. For example, a larger current ("inrush current") may be drawn by the motor of the compressor during the startup sequence of the compressor (e.g., larger amperage during the compressor's startup, etc.). In an embodiment, the climate controller can determine whether the compressor is in its startup sequence based on the amount of time since initiating the electric motor of compressor (e.g., the amount of time since current was first supplied to the motor). The climate controller may determine that the compressor is not in its startup sequence when a startup period for the electric motor has elapsed. The climate controller can determine that the compressor is not in its startup sequence when the time elapsed since initiating the electric motor is greater than the startup period (e.g., not in startup after elapsing the startup period from when current was initially supplied to start the electrical motor, etc.). The startup period can be a predetermined amount of time that is based on, for example, the amount of time normally needed by the compressor to complete its startup (e.g., to reach a steady state operation, normal amount of time for the startup sequence to complete, etc.).

In an embodiment, the climate controller may be configured to determine that the compressor is in its startup sequence at 1020 by comparing the detected current of the electrical power supplied to the motor to an expected inrush current. The expected draw limit can be a value determined based on previous testing (e.g., of the compressor 110, of the motor 120, of the climate control circuit 105, of a motor/compressor/climate control circuit with the same or a similar configuration, etc.). For example, the climate controller may be configured to determine that the compressor is not in its startup sequence at 1020 when the detected electrical current being supplied to the motor exceeds an expected inrush current by more than a predetermined threshold. The detected electrical current exceeding the expected inrush current by the predetermined threshold can indicate, for example, that the compressor is malfunctioning (e.g., locked rotor, electrical short, etc.) and not simply in its startup sequence.

If the climate controller determines that the compressor is in startup sequence at optional 1020 (e.g., less than the startup period for the compressor, less than the predetermined amount of time has elapsed since the motor's initiation, electrical current being supplied to the motor is at or less than the expected inrush current, etc.), the method 1000 returns to optional 1020. In an embodiment, the climate controller may be configured to delay for a specific amount of time before returning to optional 1020. If the climate controller determines that the compressor is not in its startup sequence at optional 1020 (e.g., at steady state, time since initiating motor's startup is equal to or greater than the predetermined amount of time, the starting period for the compressor has elapsed, etc.), the method 1000 continues to 1030. Accordingly, the proceeding actions after optional 1020 (e.g., at 1030, at 1040, at 1060, at 1060, etc.) in an embodiment can occur after the startup sequence of the compressor. For example, the operation parameter(s) detected at 1030 are not for and/or during the startup sequence of the compressor of the compressor (e.g., do not correspond to a normal inrush current for starting the electric motor, etc.). In an embodiment, the method 1000 may not include optional 1020. In such an embodiment, the method 1000 can proceed directly from 1010 to 1030.

At 1030, the climate controller detects one or more operating parameters of the sealed electrical feedthrough. In some embodiments, the detected operating parameters(s) of the sealed electrical feedthrough can include a suction pressure of the compressor (e.g., suction pressure $P_1$) and/or an amperage of the electrical power through the sealed electrical feedthrough (e.g., amperage $I_1$).

In an embodiment, detecting one or more operating parameters of the sealed electrical feedthrough at 1030 can include detecting the suction pressure of the compressor at 1032. A climate controller can be configured to detect the suction pressure of the compressor at 1032 via a pressure sensor of the climate control circuit (e.g., pressure sensor 186).

In an embodiment, detecting one or more operating parameters of the sealed electrical feedthrough at 1030 can include detecting the amperage of the electrical power supplied to the sealed electrical feedthrough 1034. In an embodiment, a climate controller may be configured to detect the amperage of the electrical power with a current sensor (e.g., current sensor 182). In an embodiment, the electrical power is supplied to the sealed electrical feedthrough via the electrical disconnecter as discussed above. In such an embodiment, the electrical disconnecter can be a contactor. The climate controller may be configured to detect the amperage of the electrical power via the contactor. As discussed above, the contact's contact position (e.g., contact position POS) corresponds with the amperage of the electrical power as the contact position varies with the amperage of the electrical power flowing through the contactor. For example, the climate controller can be configured to detect the amperage of the electrical power by detecting the contact position of the contactor (e.g., contact position POS). The method 1000 then proceeds from 1030 to 1040.

At 1040, the climate controller determines whether the sealed electrical feedthrough is in a melting condition based on the detected one or more operation conditions of the sealed electrical feedthrough. For example, the climate controller may determine whether the sealed electrical feedthrough is in a melting condition at 1040 by comparing each of the detected operating condition(s) of the sealed electrical feedthrough to a respective predetermined threshold/limit.

In some embodiments, determining whether the sealed electrical feedthrough is in a melting condition at 1040 can include comparing the detected suction pressure to a predetermined suction pressure threshold at 1042 and/or comparing the detected amperage to a predetermined amperage draw limit at 1044. At 1042, the climate controller compares the detected suction pressure of the compressor (e.g., the suction pressure detected at 1032) to a predetermined suction pressure threshold. The climate controller can be configured to determine that the sealed electrical feedthrough is in the melting condition at 1042 when the detected suction pressure is less than the predetermined suction pressure threshold.

At 1044, the climate controller compares the detected amperage for the electrical power supplied to the sealed electrical feedthrough (e.g., the detected amperage at 1034, etc.) to a predetermined amperage draw limit. The climate controller can be configured to determine that the sealed electrical feedthrough is in a melting condition when the detected amperage exceeds the predetermined amperage draw limit. In an embodiment, the predetermined amperage draw limit may be based on an amperage capable of causing the potting of the sealed electrical feedthrough to reach the potting's melting point (e.g., amperage that heat(s) the electrical pin(s) to the melting point of the potting). For example, the predetermined amperage draw may be above normal maximum operating current for the motor of the compressor (e.g., above expected inrush current, etc.) and below the amperage that can cause heating of the potting to its melting point. For example, the detected amperage exceeds the predetermined amperage draw limit indicates increasing current draw by the motor, which can eventually lead to the current draw by the motor reaching the amperage that causes heating of the potting to its melting point. The method 1000 then proceeds from 1040 to 1050.

At 1050, when the sealed electrical feedthrough is determined to be in a melting condition, the method 1000 proceeds to the 1060. When determined that the sealed electrical feedthrough is not operating in a melting condition, the method proceeds back to 1010. For example, the climate controller returns to 1010 and continues the climate control circuit's conditioning of the climate controlled space when its determined that the sealed electrical feedthrough is not operating in the melting condition.

At 1060, the operation of the climate control circuit is adjusted so that the sealed electrical feedthrough is no longer in the melting condition. For example, the climate controller controls the climate control circuit so that the sealed electrical feedthrough is no longer operating at the melting condition. In some embodiments, the adjustment of the climate control circuit at 1060 can include further opening the EEV (e.g., EEV 140) of the climate control circuit at 1062 and/or opening an electrical disconnecter (e.g., electrical disconnecter 172) that conducts the electrical power to the compressor at 1064. In an embodiment, the adjustment of the climate control circuit at 1060 may include adjusting operation of the compressor (e.g., adjusting the current being supplied by the electrical power system 160, etc.).

At 1062, the climate controller opens the EEV further (e.g., opens the EEV further from its valve position at 1016, etc.) such that the sealed electrical feedthrough is no longer in a melting condition. The opening of the EEV increases the flow rate of the working fluid through the EEV. The increased flow of working fluid causes an increase in the suction pressure of the compressor. In an embodiment, the climate controller may be configured to further open EEV at 1062 in response to the sealed electrical feedthrough being in a melting condition as determined based on the suction pressure at 1042. The EEV is opened further 1062 by at least an amount that the sealed electrical feedthrough is no longer in a melting condition. For example, the climate controller can be configured to further open the EEV at 1062 such that the suction pressure of the compressor is at or above the predetermined suction pressure threshold.

In an embodiment, the climate controller may open the EEV at 1062 by adjusting the EEV from its first valve position (e.g., the first valve position based on controlling the superheat of the heated working fluid, based on the temperature $T_1$ of the heated working fluid, etc.) to a second valve position. In an embodiment, the opening of the EEV at 1062 decreases the conditioning provided to the climate controlled space. For example, the opening of the EEV can cause the evaporator to provide less cooling of the air, such that the climate control circuit provides a lesser amount of cooling to the climate controlled space. This adjustment can result in the climate controlled circuit not providing sufficient conditioning and the climate controlled space being conditioned to a temperature above its temperature setpoint.

In an embodiment, the method 1000 at 1062 may include continuing operation of the climate control circuit to provide conditioning to the climate controlled space as described for 1010, except with the further opening of the EEV being maintained (e.g., operating so that each valve position of the EEV based on providing climate conditioning is modified similar to the adjustment from the first valve step to the second valve step, etc.). For example, the climate controller can be configured to keep the EEV further opened until instructed that the suction pressure issue has been fixed. An operator and/or technician may instruct the climate controller that the leak is repaired via, for example, a HMI (e.g., HMI 190) and/or a telematics unit (e.g., telematics unit 192) connected to the TCCS. In such embodiments, the method 1000 would stay at 1062 or a subsequent step of 1060 (e.g., 1070) until receiving said instructions. After receiving instructions that the amperage issue has been fixed, the method 1000 may return to 1010. For example, the climate controller is configured to close the electrical disconnecter once receiving instructions that the amperage issue has been fixed.

At 1064, climate controller opens an electrical disconnecter (e.g., electrical disconnecter 172) of the electrical power system to interrupt the flow of the electrical power to motor of the compressor. When the electrical disconnecter is open, no electrical power is flowing through the sealed electrical feedthrough and the sealed electrical feedthrough is also no longer in a melting condition (e.g., amps through the sealed electrical feedthrough is zero which is less than the predetermined amperage draw limit, etc.). The compressor is shutdown as no power is being supplied to its motor. In an embodiment, the climate controller may be configured to open the electrical disconnecter at 1064 in response to sealed electrical feedthrough being in a melting condition as determined based on the suction pressure at 1042 and/or as determined based on the amperage of the mechanical power at 1044. The open electrical circuit also prevents the startup of the electrical motor/compressor.

In some embodiments, the method 1000 may include the electrical disconnecter remaining open until the climate controller is instructed that the melting condition has been fixed (e.g., the issue causing the low suction pressure, the issue causing the high amperage, etc.). For example, the climate controller can be configured to keep the electrical disconnecter open (e.g., to not close the open electrical disconnecter, etc.) until instructed that the amperage issue and/or suction pressure has been fixed. An operator and/or technician may instruct the climate controller that melting condition issue has been fixed via, for example, a HMI (e.g., HMI 190) and/or a telematics unit (e.g., telematics unit 192) connected to the TCCS. In such embodiments, the method 1000 would stay at 1062 or subsequent 1060 (e.g., at 1070) until receiving said instructions. After receiving instructions that the amperage issue has been fixed, the method 1000 may return to 1010. For example, the climate controller is configured to close the electrical disconnecter once receiving instructions that the amperage issue has been fixed (e.g., a technician has replaced the compressor, etc.). The method 1000 can then proceed to optional 1070 or the method 1000 ends.

At optional 1070, the climate controller issues a warning that the melting condition of the sealed electrical feedthrough occurred. The warning may include how the melting condition was addressed. For example, the warning may include that the compressor has been shutdown by opening the electrical disconnecter at 1064 or the increased opening of the EEV at 1064. In an embodiment, issuing the warning 1060 can include an HMI connected to the climate controller displaying the warning to warn an operator of the climate controlled transport unit (e.g., climate controlled transport unit 1). In an embodiment, issuing the warning 1060 can include a telematics unit (e.g., telematics unit 192) connected to the climate controller wirelessly sending the warning to a remote device (e.g., a computer, a server, a server network, etc).

Aspects:

Any of aspects 1-13 can be combined with any of aspects 14-20.

Aspect 1. A method of feedthrough protection and overcurrent protection of a sealed compressor used in a transport climate control system ("TCCS") that provides climate control within a climate controlled space of a transport unit, the TCCS including a climate control circuit with the sealed compressor, the sealed compressor including an outer housing and an electrical motor within the outer housing, the method comprising:

operating the sealed compressor to compress a working fluid by supplying electrical power to the electric motor of the sealed compressor via a sealed electrical feedthrough in the outer housing of the sealed compressor;

detecting an operating parameter of the sealed electrical feedthrough;

determining whether the sealed electrical feedthrough is in a melting condition based on the detected operating parameter; and
adjusting operation of the climate control circuit upon determining that the sealed electrical feedthrough is in the melting condition until the sealed electrical feedthrough is no longer in the melting condition.

Aspect 2. The method of aspect 1, wherein
detecting the operating parameter includes detecting an amperage of the electrical power supplied to the sealed electrical feedthrough, and
determining whether the sealed electrical feedthrough is in the melting condition includes comparing the detected amperage of the electrical power to a predetermined amperage draw limit.

Aspect 3. The method of any one of aspects 1 and 2, wherein
supplying the electrical power to the electric motor includes supplying the electrical power from an electrical power source of the TCCS to the sealed electrical feedthrough via an electrical disconnecter, and
adjusting operation of the climate control circuit includes opening the electrical disconnecter to interrupt the electrical power from the electrical power source to the sealed electrical feedthrough.

Aspect 4. The method of aspect 3, wherein supplying the electrical power from the electrical power source to the sealed electrical feedthrough via the electrical disconnecter includes converting, via an inverter, the electrical power supplied from the electrical power source from direct current to alternating current.

Aspect 5. The method of any one of aspects 1-4, wherein supplying electrical power to the electric motor via the sealed electrical feedthrough includes supplying the electrical power from an electrical power source of the TCCS to the sealed electrical feedthrough via a contactor, and
wherein detecting the operating parameter of the sealed electrical feedthrough includes detecting a positional status of the contactor, the positional status of the contactor corresponding with an amperage of the electrical power supplied through the sealed electrical feedthrough.

Aspect 6. The method of any one of aspects 1-5, wherein detecting the operating parameter includes detecting a suction pressure of the sealed compressor, and
wherein determining whether the sealed electrical feedthrough is in the melting condition includes comparing the detected suction pressure to a predetermined suction pressure threshold.

Aspect 7. The method of aspect 6, wherein an internal space of the outer housing along the sealed electrical feedthrough is below atmospheric pressure when the suction pressure of the sealed compressor is below the predetermined suction pressure threshold.

Aspect 8. The method of any one of aspects 1-7, wherein adjusting operation of the climate control circuit includes further opening an electronic expansion device ("EEV") of the climate control circuit.

Aspect 9. The method of aspect 7, wherein the further opening of the EEV decreases conditioning provided by the climate control circuit to a climate controlled space of the transport unit.

Aspect 10. The method of any one of aspects 1-9, further comprising:
operating the climate control circuit to provide conditioning for the climate controlled space of the transport unit based on a temperature setpoint for the climate controlled space, wherein operating the climate control circuit to provide the conditioning includes:
the operating the sealed compressor to compress the working fluid, and
adjusting an electronic expansion valve ("EEV") of the climate control circuit to a first valve position based on a temperature of the working fluid,
wherein the adjusting operation of the climate control circuit includes further opening the EEV to a second valve position different from the first valve position.

Aspect 11. The method of any one of aspects 1-10, wherein the operating parameter of the electrical feedthrough is not for the startup sequence of the sealed compressor.

Aspect 12. The method of any one of aspects 1-11, wherein the working fluid includes a flammable refrigerant.

Aspect 13. The method of any one of aspects 1-12, wherein the sealed compressor is at least one of a hermetic compressor and a semi-hermetic compressor.

Aspect 14. A transport climate control system (TCCS) for providing climate control within a climate controlled space of a transport unit, the TCCS comprising:
a climate control circuit including:
a sealed compressor to compress a working fluid, the sealed compressor including an outer housing, an electric motor within the outer housing, and a sealed electrical feedthrough in the outer housing,
a condenser to cool the working fluid,
an expansion valve to expand the working fluid, and
an evaporator to heat the working fluid;
an electrical power source;
a climate controller configured to:
operate the climate control circuit to provide conditioning to the climate controlled space of the transport unit, which includes electrical power being supplied from the electrical power source to the electric motor via the sealed electrical feedthrough,
detect an operating parameters of the sealed electrical feedthrough,
determine whether the sealed electrical feedthrough is in a melting condition based on the detected operating parameter, and
adjust operation of the climate control circuit when the sealed electrical feedthrough is in the melting condition until the sealed electrical feedthrough is no longer in the melting condition.

Aspect 15. The TCCS of aspect 14, wherein the climate controller is configured to:
detect an amperage of the electrical power through the sealed electrical feedthrough, in order to detect the operating parameter of the sealed electrical feedthrough, and
determine that the sealed electrical feedthrough is in the melting condition based on comparing the detected amperage of the electrical power to a predetermined amperage draw limit.

Aspect 16. The TCCS of any one of aspects 14 and 15, further comprising:
an electrical disconnecter electrically connecting the electrical power source to the sealed electrical feedthrough, wherein
the climate controller is configured to open the electrical disconnecter to interrupt the electrical power supplied to the electrical motor via the sealed electrical feedthrough in order to adjust operation of the climate control circuit such that the sealed electrical feedthrough is no longer in the melting condition.

Aspect 17. The TCCS of any one of aspects 14-16, further comprising:

a contactor electrically connecting the electrical power source to the sealed electrical feedthrough, wherein the climate controller is configured to detect a positional status of the contactor, the positional status of the contactor corresponding with an amperage of the electrical power supplied through the sealed electrical feedthrough in order to detect one or more operating parameters of the sealed electrical feedthrough.

Aspect 18. The TCCS of any one of aspects 14-17, wherein the climate controller is configured to:

detect a suction pressure of the sealed compressor in order to detect the operating parameter, and determine that the sealed electrical feedthrough is in the melting condition based on comparing the detected suction pressure to a predetermined suction pressure threshold.

Aspect 19. The TCCS of any one of aspects 14-18, wherein the expansion valve is an electronic expansion valve ("EEV"), and the climate controller is configured to further open the electronic in order to adjust operation of the climate control circuit such that the sealed electrical feedthrough is no longer in the melting condition.

Aspect 20. The TCCS of any one of aspects 14-19, wherein the sealed compressor is a hermetic compressor or a semi-hermetic compressor.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A method of feedthrough protection and overcurrent protection of a sealed compressor used in a transport climate control system ("TCCS") that provides climate control within a climate controlled space of a transport unit, the TCCS including a climate control circuit with the sealed compressor, the sealed compressor including an outer housing and an electrical motor within the outer housing, the method comprising:

operating the sealed compressor to compress a working fluid by supplying electrical power to the electric motor of the sealed compressor via a sealed electrical feedthrough in the outer housing of the sealed compressor;

detecting one or more operating parameters of the sealed electrical feedthrough, which includes detecting an amperage of the electrical power supplied to the sealed electrical feedthrough;

determining whether the sealed electrical feedthrough is in a melting condition based on the detected one or more operating parameters, which includes comparing the detected amperage of the electrical power to a predetermined amperage draw limit that is based on a minimum amperage that causes melting of a potting of the sealed electrical feedthrough; and adjusting operation of the climate control circuit upon determining that the sealed electrical feedthrough is in the melting condition until the sealed electrical feedthrough is no longer in the melting condition.

2. The method of claim 1, wherein supplying the electrical power to the electric motor includes supplying the electrical power from an electrical power source of the TCCS to the sealed electrical feedthrough via an electrical disconnecter, and adjusting operation of the climate control circuit includes opening the electrical disconnecter to interrupt the electrical power from the electrical power source to the sealed electrical feedthrough.

3. The method of claim 2, wherein supplying the electrical power from the electrical power source to the sealed electrical feedthrough via the electrical disconnecter includes converting, via an inverter, the electrical power supplied from the electrical power source from direct current to alternating current.

4. The method of claim 1, wherein supplying electrical power to the electric motor via the sealed electrical feedthrough includes supplying the electrical power from an electrical power source of the TCCS to the sealed electrical feedthrough via a contactor, and wherein detecting the one or more operating parameters of the sealed electrical feedthrough includes detecting a positional status of the contactor, the positional status of the contactor corresponding with an amperage of the electrical power supplied through the sealed electrical feedthrough.

5. The method of claim 1, wherein adjusting operation of the climate control circuit includes further opening an electronic expansion device ("EEV") of the climate control circuit.

6. The method of claim 1, further comprising:

operating the climate control circuit to provide conditioning for the climate controlled space of the transport unit based on a temperature setpoint for the climate controlled space, wherein operating the climate control circuit to provide the conditioning includes:

the operating the sealed compressor to compress the working fluid, and adjusting an electronic expansion valve ("EEV") of the climate control circuit to a first valve position based on a temperature of the working fluid, wherein the adjusting operation of the climate control circuit includes further opening the EEV to a second valve position different from the first valve position.

7. The method of claim 1, wherein the one or more operating parameters of the electrical feedthrough are not detected for the startup sequence of the sealed compressor.

8. The method of claim 1, wherein the working fluid includes a flammable refrigerant.

9. The method of claim 1, wherein the sealed compressor is at least one of a hermetic compressor and a semi-hermetic compressor.

10. A method of feedthrough protection and overcurrent protection of a sealed compressor used in a transport climate control system ("TCCS") that provides climate control within a climate controlled space of a transport unit, the TCCS including a climate control circuit with the sealed compressor, the sealed compressor including an outer housing and an electrical motor within the outer housing, the method comprising:

operating the sealed compressor to compress a working fluid by supplying electrical power to the electric motor of the sealed compressor via a sealed electrical feedthrough in the outer housing of the sealed compressor;

detecting one or more operating parameters of the sealed electrical feedthrough, which includes detecting a suction pressure of the sealed compressor;

determining whether the sealed electrical feedthrough is in a melting condition based on the detected one or more operating parameters, which includes comparing the detected suction pressure to a predetermined suction pressure threshold; and adjusting operation of the climate control circuit upon determining that the sealed electrical feedthrough is in the melting condition until the sealed electrical feedthrough is no longer in the melting condition.

11. The method of claim 10, wherein an internal space of the outer housing along the sealed electrical feedthrough is below atmospheric pressure when the suction pressure of the sealed compressor is below the predetermined suction pressure threshold.

12. The method of claim 11, wherein the further opening of the EEV decreases conditioning provided by the climate control circuit to a climate controlled space of the transport unit.

13. A transport climate control system (TCCS) for providing climate control within a climate controlled space of a transport unit, the TCCS comprising:
   a climate control circuit including:
      a sealed compressor to compress a working fluid, the sealed compressor including an outer housing, an electric motor within the outer housing, and a sealed electrical feedthrough in the outer housing,
      a condenser to cool the working fluid,
      an expansion valve to expand the working fluid, and
      an evaporator to heat the working fluid;
   an electrical power source; and
   a climate controller configured to:
      operate the climate control circuit to provide conditioning to the climate controlled space of the transport unit, which includes electrical power being supplied from the electrical power source to the electric motor via the sealed electrical feedthrough,
      detect one or more operating parameter of the sealed electrical feedthrough, which includes detecting an amperage of the electrical power supplied to the sealed electrical feedthrough,
      determine whether the sealed electrical feedthrough is in a melting condition based on the detected one or more operating parameters, which includes comparing the detected amperage of the electrical power to a predetermined amperage draw limit that is based on a minimum amperage that causes melting of a potting of the sealed electrical feedthrough, and
      adjust operation of the climate control circuit when the sealed electrical feedthrough is in the melting condition until the sealed electrical feedthrough is no longer in the melting condition.

14. The TCCS of claim 13, further comprising:
an electrical disconnecter electrically connecting the electrical power source to the sealed electrical feedthrough, wherein
the climate controller is configured to open the electrical disconnecter to interrupt the electrical power supplied to the electrical motor via the sealed electrical feedthrough in order to adjust operation of the climate control circuit such that the sealed electrical feedthrough is no longer in the melting condition.

15. The TCCS of claim 13, further comprising:
a contactor electrically connecting the electrical power source to the sealed electrical feedthrough,
wherein the climate controller is configured to detect a positional status of the contactor, the positional status of the contactor corresponding with an amperage of the electrical power supplied through the sealed electrical feedthrough, in order to detect the one or more operating parameters of the sealed electrical feedthrough.

16. The TCCS of claim 13, wherein
the expansion valve is an electronic expansion valve ("EEV"), and
the climate controller is configured to further open the electronic in order to adjust operation of the climate control circuit such that the sealed electrical feedthrough is no longer in the melting condition.

17. The TCCS of claim 13, wherein the sealed compressor is a hermetic compressor or a semi-hermetic compressor.

18. A transport climate control system (TCCS) for providing climate control within a climate controlled space of a transport unit, the TCCS comprising:
   a climate control circuit including:
      a sealed compressor to compress a working fluid, the sealed compressor including an outer housing, an electric motor within the outer housing, and a sealed electrical feedthrough in the outer housing,
      a condenser to cool the working fluid,
      an expansion valve to expand the working fluid, and
      an evaporator to heat the working fluid;
   an electrical power source; and
   a climate controller configured to:
      operate the climate control circuit to provide conditioning to the climate controlled space of the transport unit, which includes electrical power being supplied from the electrical power source to the electric motor via the sealed electrical feedthrough,
      detect one or more operating parameters of the sealed electrical feedthrough, which includes the climate controller being configured to detect a suction pressure of the sealed compressor,
      determine whether the sealed electrical feedthrough is in a melting condition based on the detected one or more operating parameters, which includes the controller being configured to compare the detected suction pressure to a predetermined suction pressure threshold,
      adjust operation of the climate control circuit when the sealed electrical feedthrough is in the melting condition until the sealed electrical feedthrough is no longer in the melting condition.

* * * * *